United States Patent [19]
Gerlach et al.

[11] 3,873,856
[45] Mar. 25, 1975

[54] INTEGRATED CIRCUIT HAVING A VOLTAGE HYSTERESIS FOR USE AS A SCHMITT TRIGGER

[75] Inventors: Albrecht Gerlach, Emmendingen; Günter Lindstedt, Freiburg; Wolfgang Gollinger, Gundelfingen, all of Germany

[73] Assignee: ITT Industries, Inc., New York, N.Y.

[22] Filed: Oct. 17, 1973

[21] Appl. No.: 407,373

[30] Foreign Application Priority Data

Oct. 24, 1972 Germany ...................... 2252130

[52] U.S. Cl. ................................ 307/279, 307/290
[51] Int. Cl. ........................................ H03k 3/295
[58] Field of Search ........ 307/205, 213, 235 R, 290, 307/304, 279

[56] References Cited

UNITED STATES PATENTS 3,109,943 11/1963 Merlen ............................ 307/290
3,700,981 10/1972 Masuhara et al. ............ 307/205 X

*Primary Examiner*—John Zazworsky
*Attorney, Agent, or Firm*—John T. O'Halloran; Menotti J. Lombardi, Jr.; Vincent Ingrassia

[57] ABSTRACT

This invention relates to a Schmitt-trigger circuit realized by MOS techniques employing insulated-gate field-effect transistors. To the common MOS inverter there is added a switched current source feeding a current to a series resistor thereby generating a voltage drop which is added to the inverter threshold voltage. The current source is switched on if the inverter transistor is blocked by the input signal.

3 Claims, 4 Drawing Figures

INTEGRATED CIRCUIT HAVING A VOLTAGE HYSTERESIS FOR USE AS A SCHMITT TRIGGER

BACKGROUND OF THE INVENTION

The present invention relates to a circuit having a voltage hysteresis (Schmitt-Trigger) realized as a monolithic integrated circuit employing insulated-gate field-effect transistors (MOS-circuit) and using an inverter consisting of a driver transistor and of a transistor connected in series therewith.

With respect to integrated circuits employing insulated-gate field-effect transistors, i.e., MOS-circuits, it is desirable to employ a small number of basic circuit units. One such basic circuit unit is the inverter, consisting of a driver transistor, to the gate of which there is applied the signal to be processed, and of a transistor connected in series with the drain-source path thereof, which is connected as a load resistor, and the operating voltage of which may be either a direct or pulse voltage (clock voltage).

SUMMARY OF THE INVETION

It is an object of the present invention to provide a circuit having a voltage hysteresis, hence a circuit having the switching behavior of a Schmitt-Trigger, which can be easily realized in integrated circuits employing insulated-gate field-effect transistors.

According to a broad aspect of the invention there is provided a monolithic integrated circuit having a voltage hysteresis for use as a Schmitt trigger comprising: a source of supply voltage; an insulated-gate field-effect driver transistor having source, gate and drain electrodes, said gate electrode for receiving an input signal; resistance means coupled between the source of said driver transistor and the zero point of the circuit; a source of current having an output coupled to the junction of said resistance means and said source electrode for supplying additional current to said junction; switching means coupled between said current source and said source of supply voltage for controlling said current source; and a first insulated-gate field-effect transistor having gate and drain electrodes coupled to said source of supply voltage and having a source electrode coupled to the drain electrode of said driver transistor and to the output of said circuit.

It is a features of the invention that the driver transistor can only be switched on again by the input signal after the amplitude of the input signal has become equal to the sum of the threshold voltage of the driver transistor and of the additional voltage as caused by the additional current applied to the resistor. The term threshold voltage is thereby meant to imply the sum of the actual threshold voltage and the increase resulting during operation owing to the substrate effect.

BRIEF DESCRIPTION OF THE DRAWINGS

The above and other objects of the drawing will be better understood from the following detailed description taken in conjunction with the accompanying drawings, in which.

DESCRIPTION OF THE PREFERRED EMBODIMENTS

Figure 1:
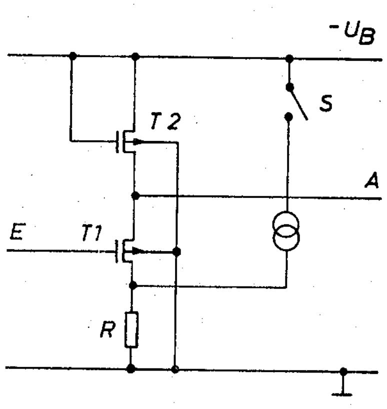
FIG. 1 is a schematic diagram of one example of embodiment of the inventive circuit employing insulated-gate field-effect transistors of the same conductivity type.

The embodiment of the inventive circuit shown in FIG. 1 contains the insulated-gate field-effect transistors T1 and T2 which are of the same kind, with the drain-source paths thereof being connected in series, and which form an inverter. In this arrangement the transistor T2 is in such a way connected as a load resistor of transistor T1, that its gate is connected to the source of supply voltage $U_B$. The input signal is applied to the gate of transistor T1 via the input E.

In the inventive manner this inverter is now supplemented by both the resistor R and the controlled switch S. In this arrangement the resistor R is in such a way arranged in the source circuit of transistor T1 that the source electrode is connected to the zero point of the circuit across the resistor R. Via the controlled switch S an additional current is applied to the point of connection of both the resistor R and the transistor T1 for effecting an increased voltage drop across the resistor R. This additional current can be achieved, for example, by inserting a high-ohmic resistor between the switch S and the connecting point. Another possibility for producing the additional current will be explained hereinafter.

The controlled switch S is controlled in such a way according to the invention as to be closed each time after the transistor T1 is blocked on account of the input signal, and is likewise reopened each time or upon unblocking of the transistor T1. In FIG. 1 all transistors are shown to have a p-conducting channel, with the n-conducting substrate thereof being connected to the zero point of the circuit which, in this particular case, corresponds to the positive pole of the source of supply voltage.

Figure 2:
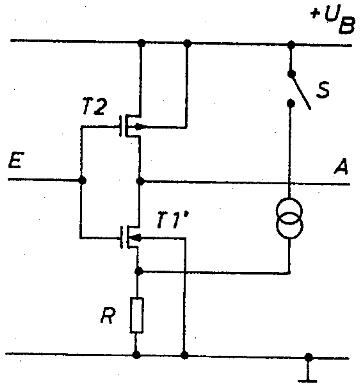
FIG. 2 is a schematic diagram of one example of embodiment of the inventive circuit employing insulated-gate field-effect transistors of complementary conductivity types.

FIG. 2 shows another example of embodiment of the inventive circuit which, unlike the arrangement according to FIG. 1, contains insulated-gate field-effect transistors of complementary conductivity type. Accordingly, the example of embodiment of FIG. 2 can be realized by the so-called C-MOS technique. The advantage of this technique resides in the fact that no direct currents flow in the individual circuit parts, because the individual inverters consist of insulated-gate field-effect transistors which are complementary with respect to one another. Thus, the inverter according to FIG. 2 shows the n-channel transistor T1′ whose substrate is connected to the zero point of the circuit which, in this particular case, is identical to the negative pole of the source of supply voltage $U_B$, as well as the p-channel transistor T2 whose substrate is connected to the source of supply voltage. The gate of transistor T2, just like the gate of the n-channel transistor T1′, is connected to the input E.

Figure 3:
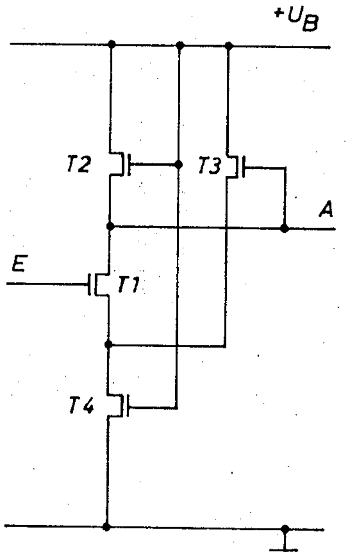
FIG. 3 is a schematic diagram of a further example of embodiment employing insulated-gate field-effect transistors of the same conductivity type.

FIG. 3 shows an example of embodiment of the arrangement according to FIG. 1 wherein, by the graphical representation (omission of the substrate arrows) it is denoted that this example of embodiment can be realized by using n- as well as by using p-channel transistors, hence respectively with insulated-gate field-effect transistors of the same conductivity type. The switch S according to FIG. 1 has been realized in FIG. 3 by the additional transistors T3 whose gate is connected to the output A, whose source is connected to the source of supply voltage $U_B$, and whose drain is connected to the drain of the driver transistor T1.

Moreover, in FIG. 3 the resistor R according to FIG. 1 has been replaced by the further transistor T4 which is connected as a resistor in that its gate is connected to the source of supply voltage $U_B$.

Figure 4:
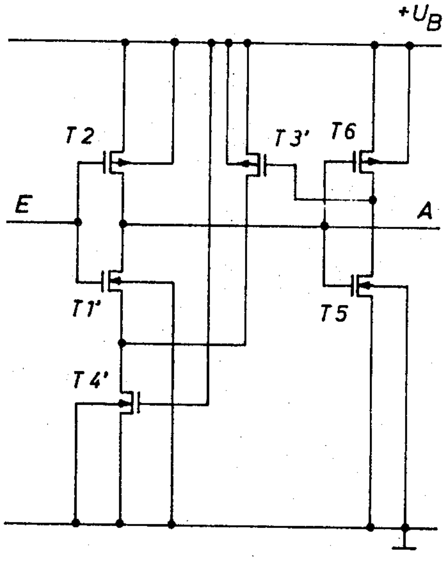
FIG. 4 is a schematic diagram of one example of embodiment of the invention employing insulated-gate field-effect transistors of complementary conductivity types.

FIG. 4 shows a further example of embodiment of the invention, again employing complementary insulated-gate field-effect transistors. In this embodiment the controlled switch S according to FIG. 2 has been replaced by the additional transistor T3' which is controlled by the transistors T5 and T6 while the resistor R has been replaced by the further transistor T4'. The transistors T5 and T6 constitute one further inverter of the same type, i.e., the transistors T1' and T5 are of the one conductivity type while the transistors T2 and T6 are of a conductivity type complementary thereto.

The gates of transistors T5 and T6 are connected to one another and are applied to the output A of the inverter composed of the transistors T1' and T2. The output of the further inverter which is identical to the common connecting point of both the transistors T5 and T6, now serves to control the gate of the additional transistor T3' whose type of conductivity is complementary to that of the driver transistor T1'. Both the source electrode and the substrate of the additional transistor T3' are applied to the source of supply voltage $U_B$ while the drain electrode thereof extends to the source electrode of the driver transistor T1'.

In the example of embodiment according to FIG. 4, the further transistor T4' which is of the same conductivity type as the driver transistor T1', now replaces the transistor R. Accordingly, both the source electrode and the substrate are connected to the zero point of the circuit while the gate is connected to the source of supply voltage $U_B$.

The mode of operation of the inventive circuit for realizing the switching behavior of a Schmitt-Trigger circuit will now be described with reference to FIG. 4. At first it be assumed that the input signal at the input E has a high positive value. In this case the driver transistor T1' is unblocked and the transistor T2 connected in series therewith, is blocked. On account of this, however, the output voltage at the output A equals zero, so that the driver transistor T5 of the further inverter is blocked while the associated complementary transistor T6 is unblocked. Accordingly, a high voltage is likewise applied to the gate of the additional transistor T3', so that this transistor is blocked.

As soon as the input voltage drops below the previously defined threshold voltage of the driver transistor T1', the latter is rendered non-conductive (blocked) while the associated transistor T2 is unblocked. On account of this the aforementioned voltage levels at the other circuit points are inverted so that the additional transistor T3' becomes unblocked and an additional current is applied to the point connecting the transistors T1' and T4'. Owing to this the amount of source electrode potential of the driver transistor T1' is increased to such an extent that upon rising of the input signal a new switching-on is only effected when the amplitude of the input signal exceeds the sum of both the threshold voltage of the driver transistor T1' and the additional voltage. Accordingly, the inventive circuit shows to have the intended hysteresis behavior or characteristic, and may thus be referred to as a Schmitt-Trigger circuit.

In case the increase of the threshold voltage of the driver transistor T1' which is due to the additional voltage owing to the so-called substrate effect, should happen to be unwanted, the driver transistor T1' may be disposed in a substrate which is insulated from the remaining transistor, which will then have to be connected to the drain of the driver transistor T1'.

The signal controlling the switch S, hence, e.g., the voltage controlling the additional transistor T3 or T3' respectively, must not absolutely originate with a further inverter which is directly associated with the circuit, but may also be derived from a logical circuit already contained per se in the entire integrated circuit. Moreover, it is not necessary to provide each time one further inverter with the transistors T5 and T6 for several inventive circuits having a voltage hysteresis as provided for in an integrated circuit. In fact, for several such circuits it is sufficient to provide one single further inverter which will then serve to control all of said additional transistors T3'.

It is to be understood that the foregoing description of specific examples of this invention is made by way of example only and is not to be considered as a limitation on its scope.

What is claimed is:

1. A monolithic integrated circuit having a voltage hysteresis for use as a Schmitt trigger comprising:

a source of supply voltage;

an insulated-gate field-effect driver transistor having source, gate and drain electrodes, said gate electrode for receiving an input singal;

a first insulated-gate field-effect transistor having source, gate and drain electrodes, said drain electrode coupled to said source of supply voltage, said gate electrode coupled to the gate electrode of said driver transistor, and the source electrode coupled to the drain electrode of said driver transistor;

a second insulated-gate field-effect transistor having source, drain and gate electrodes, said drain electrode coupled to said source of supply voltage and said source electrode coupled to the source electrode of said driver transistor for supplying additional current to the source of said driver transistor;

a third insulated-gate field-effect transistor having source, drain and gate electrodes, said gate electrode coupled to said source of supply voltage, said source electrode coupled to the zero point of the circuit, and said drain electrode coupled to the source electrode of said driver transistor and source electrode of said second transistor;

a fourth insulated-gate field-effect transistor having source, drain and gate electrodes, said drain electrode coupled to said source of supply voltage and said source electrode coupled to the gate electrode of said second transistor; and a fifth insulated-gate field-effect transistor having source, drain and gate electrodes, said source electrode coupled to the zero point of the circuit, said drain electrode coupled to the source electrode of said fourth transistor and the gate electrode of said second transistor, and said gate electrode coupled to the gate electrode of said fourth transistor and the drain electrode of said driver transistor, said fourth and fifth transistor forming an inverter for controlling said second transistor.

2. A circuit according to claim 1 wherein said second transistor has a conductivity opposite to that of said driver transistor.

3. A circuit according to claim 2 wherein said third transistor is of the same conductivity type as said driver transistor.

* * * * *